(12) United States Patent
Shimizu

(10) Patent No.: US 7,339,713 B2
(45) Date of Patent: Mar. 4, 2008

(54) OPTICAL BEAM SCANNER, IMAGE FORMING DEVICE, AND OPTICAL BEAM SCANNING METHOD

(75) Inventor: Hitomi Shimizu, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/509,444

(22) Filed: Aug. 24, 2006

(65) Prior Publication Data
US 2007/0047048 A1    Mar. 1, 2007

(30) Foreign Application Priority Data
Aug. 25, 2005   (JP) .............................. 2005-244351

(51) Int. Cl.
*G02B 26/08* (2006.01)
(52) U.S. Cl. ...................... 359/216; 250/236; 359/900
(58) Field of Classification Search ...................... None
See application file for complete search history.

(56) References Cited
U.S. PATENT DOCUMENTS
5,578,819 A * 11/1996 Kataoka et al. ............. 250/235

FOREIGN PATENT DOCUMENTS

| JP | 64-073369 | | 3/1989 |
|---|---|---|---|
| JP | 09-230273 | | 5/1997 |
| JP | 10-20220 | * | 1/1998 |
| JP | 10-000813 | | 6/1998 |
| JP | 2005-193380 | | 7/2005 |

* cited by examiner

*Primary Examiner*—James Phan
(74) *Attorney, Agent, or Firm*—Ladas & Parry LLP

(57) ABSTRACT

An optical beam scanner includes a driving unit rotating a rotary polygon mirror that deflects and scans an optical beam; a rotation position detection unit; a rotation control unit controlling the driving unit in accordance with a rotation reference signal and an output signal of the rotation position detection unit; an optical beam detection unit detecting the optical beam at a predetermined position on a scanning path so as to generate a horizontal synchronizing signal; a first timing generation unit generating a first reference timing so as to print a first surface; a second timing generation unit generating a second reference timing so as to print a second surface; a timing measurement unit measuring a counter value according to the horizontal synchronizing signal; and a phase control unit controlling a phase of the rotation reference signal in accordance with the counter value obtained by the timing measurement unit.

10 Claims, 10 Drawing Sheets

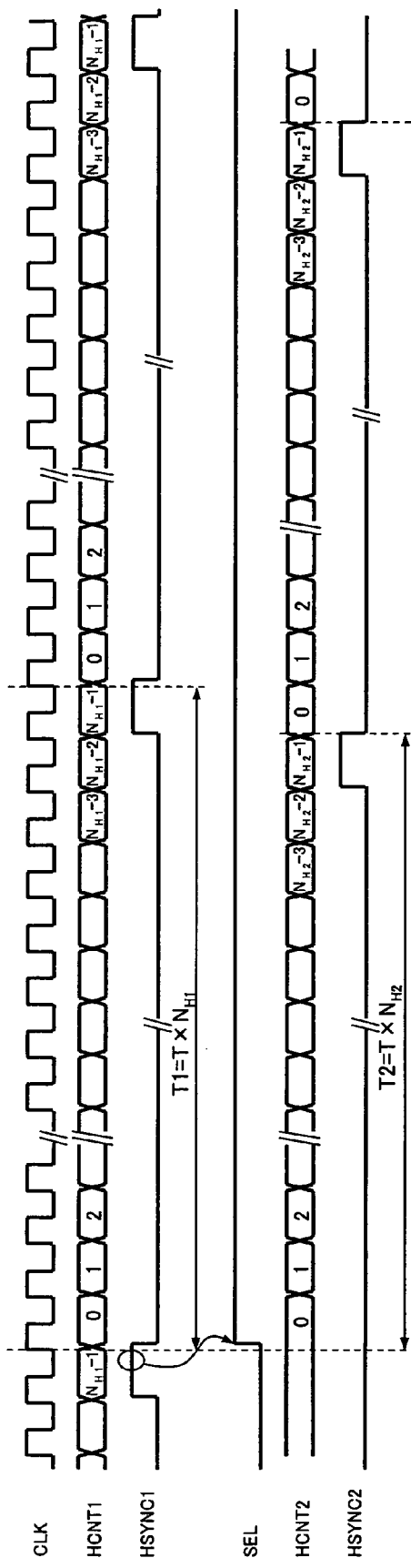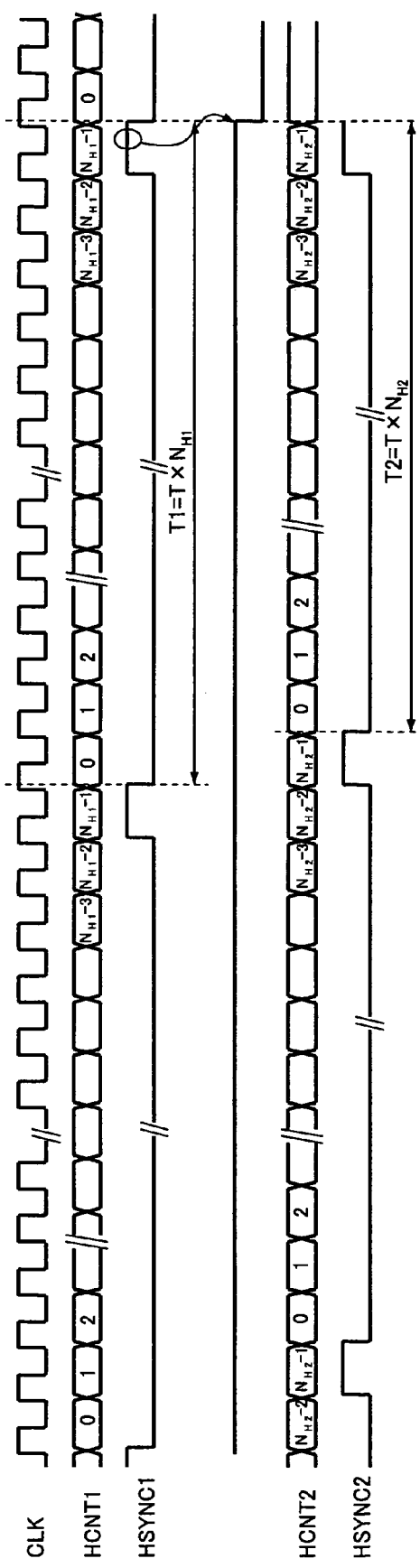

FIG.8

| $N_{H1}$ | $N_{H2}$ | $X=N_{H2}/N_{H1}$ | P1=X/(1-X) | P2=1/(1-X) | $N_{H1}$*P1 | $N_{H2}$*P2 |
|---|---|---|---|---|---|---|
| 4000 | 3950 | 0.9875 | 79 | 80 | 316000 | 316000 |
| 4000 | 3951 | 0.98775 | 80.63265306 | 81.63265306 | 322530.6122 | 322530.6122 |
| 4000 | 3952 | 0.988 | 82.33333333 | 83.33333333 | 329333.3333 | 329333.3333 |
| 4000 | 3953 | 0.98825 | 84.10638298 | 85.10638298 | 336425.5319 | 336425.5319 |
| 4000 | 3954 | 0.9885 | 85.95652174 | 86.95652174 | 343826.087 | 343826.087 |
| 4000 | 3955 | 0.98875 | 87.88888889 | 88.88888889 | 351555.5556 | 351555.5556 |
| 4000 | 3956 | 0.989 | 89.90909091 | 90.90909091 | 359636.3636 | 359636.3636 |
| 4000 | 3957 | 0.98925 | 92.02325581 | 93.02325581 | 368093.0233 | 368093.0233 |
| 4000 | 3958 | 0.9895 | 94.23809524 | 95.23809524 | 376952.381 | 376952.381 |
| 4000 | 3959 | 0.98975 | 96.56097561 | 97.56097561 | 386243.9024 | 386243.9024 |
| 4000 | 3960 | 0.99 | 99 | 100 | 396000 | 396000 |
| 4000 | 3961 | 0.99025 | 101.5641026 | 102.5641026 | 406256.4103 | 406256.4103 |
| 4000 | 3962 | 0.9905 | 104.2631579 | 105.2631579 | 417052.6316 | 417052.6316 |
| 4000 | 3963 | 0.99075 | 107.1081081 | 108.1081081 | 428432.4324 | 428432.4324 |
| 4000 | 3964 | 0.991 | 110.1111111 | 111.1111111 | 440444.4444 | 440444.4444 |
| 4000 | 3965 | 0.99125 | 113.2857143 | 114.2857143 | 453142.8571 | 453142.8571 |
| 4000 | 3966 | 0.9915 | 116.6470588 | 117.6470588 | 466588.2353 | 466588.2353 |
| 4000 | 3967 | 0.99175 | 120.2121212 | 121.2121212 | 480848.4848 | 480848.4848 |
| 4000 | 3968 | 0.992 | 124 | 125 | 496000 | 496000 |
| 4000 | 3969 | 0.99225 | 128.0322581 | 129.0322581 | 512129.0323 | 512129.0323 |
| 4000 | 3970 | 0.9925 | 132.3333333 | 133.3333333 | 529333.3333 | 529333.3333 |
| 4000 | 3971 | 0.99275 | 136.9310345 | 137.9310345 | 547724.1379 | 547724.1379 |
| 4000 | 3972 | 0.993 | 141.8571429 | 142.8571429 | 567428.5714 | 567428.5714 |
| 4000 | 3973 | 0.99325 | 147.1481481 | 148.1481481 | 588592.5926 | 588592.5926 |
| 4000 | 3974 | 0.9935 | 152.8461538 | 153.8461538 | 611384.6154 | 611384.6154 |
| 4000 | 3975 | 0.99375 | 159 | 160 | 636000 | 636000 |
| 4000 | 3976 | 0.994 | 165.6666667 | 166.6666667 | 662666.6667 | 662666.6667 |
| 4000 | 3977 | 0.99425 | 172.9130435 | 173.9130435 | 691652.1739 | 691652.1739 |
| 4000 | 3978 | 0.9945 | 180.8181818 | 181.8181818 | 723272.7273 | 723272.7273 |
| 4000 | 3979 | 0.99475 | 189.4761905 | 190.4761905 | 757904.7619 | 757904.7619 |
| 4000 | 3980 | 0.995 | 199 | 200 | 796000 | 796000 |
| 4000 | 3981 | 0.99525 | 209.5263158 | 210.5263158 | 838105.2632 | 838105.2632 |
| 4000 | 3982 | 0.9955 | 221.2222222 | 222.2222222 | 884888.8889 | 884888.8889 |
| 4000 | 3983 | 0.99575 | 234.2941176 | 235.2941176 | 937176.4706 | 937176.4706 |
| 4000 | 3984 | 0.996 | 249 | 250 | 996000 | 996000 |
| 4000 | 3985 | 0.99625 | 265.6666667 | 266.6666667 | 1062666.667 | 1062666.667 |
| 4000 | 3986 | 0.9965 | 284.7142857 | 285.7142857 | 1138857.143 | 1138857.143 |
| 4000 | 3987 | 0.99675 | 306.6923077 | 307.6923077 | 1226769.231 | 1226769.231 |
| 4000 | 3988 | 0.997 | 332.3333333 | 333.3333333 | 1329333.333 | 1329333.333 |
| 4000 | 3989 | 0.99725 | 362.6363636 | 363.6363636 | 1450545.455 | 1450545.455 |
| 4000 | 3990 | 0.9975 | 399 | 400 | 1596000 | 1596000 |
| 4000 | 3991 | 0.99775 | 443.4444444 | 444.4444444 | 1773777.778 | 1773777.778 |
| 4000 | 3992 | 0.998 | 499 | 500 | 1996000 | 1996000 |
| 4000 | 3993 | 0.99825 | 570.4285714 | 571.4285714 | 2281714.286 | 2281714.286 |
| 4000 | 3994 | 0.9985 | 665.6666667 | 666.6666667 | 2662666.667 | 2662666.667 |
| 4000 | 3995 | 0.99875 | 799 | 800 | 3196000 | 3196000 |
| 4000 | 3996 | 0.999 | 999 | 1000 | 3996000 | 3996000 |
| 4000 | 3997 | 0.99925 | 1332.333333 | 1333.333333 | 5329333.333 | 5329333.333 |
| 4000 | 3998 | 0.9995 | 1999 | 2000 | 7996000 | 7996000 |
| 4000 | 3999 | 0.99975 | 3999 | 4000 | 15996000 | 15996000 |

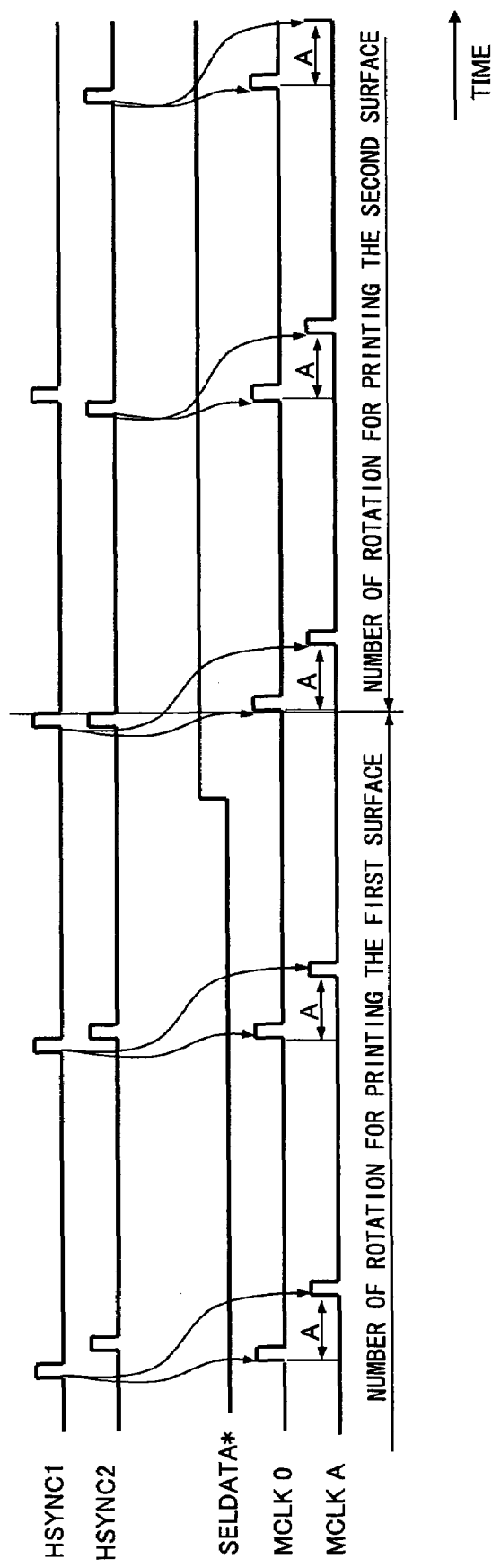

OPTICAL BEAM SCANNER, IMAGE FORMING DEVICE, AND OPTICAL BEAM SCANNING METHOD

BACKGROUND OF THE INVENTION

1. Field of the Invention

The present invention generally relates to an optical beam scanner, an image forming device, and an optical beam scanning method, and more specifically, to an optical beam scanner, an image forming device, and an optical beam scanning method realizing forming a high quality image by using optical beam scanning according to a rotary polygon mirror.

2. Description of the Related Art

Conventionally, as an optical beam scanner used in an image forming device such as a copier, a facsimile, a printer, a printing press, and the like, Japanese Laid-Open Patent Application Publication No. S64-73369 discloses an optical beam scanner which is configured to rotate plural rotary polygon mirrors which deflect and scan an optical beam onto an image supporter and detect rotating positions of the rotary polygon mirrors so that the rotary polygon mirrors are rotated at constant speed.

In the above described optical beam scanner, the plural rotary polygon mirrors are driven to rotate at constant speed by respective driving units in accordance with rotation reference signals corresponding to the rotary polygon mirrors and output signals of the detected rotating positions.

Further, in an image forming device including the above described optical beam scanner, independent latent images are formed on the corresponding image supporters according to an optical beam which is deflected and scanned by the rotary polygon mirrors. Then, the latent images developed to be pixel images are superposed and transferred onto a recording medium.

In order to superpose the pixel images at respective correct positions on the recording medium, positions for starting image forming in the main scanning direction and the sub scanning direction of the pixel images on the image supporter must be adjusted correctly.

As for the main scanning direction, the optical beam is detected at a predetermined position on a scanning path, and timing for writing each scanning line of the pixel images is adjusted in accordance with the detection result. Accordingly, it is possible to prevent an image shift in the main scanning direction. On the other hand, as for the sub scanning direction, where plural image supporters are provided corresponding to the plural rotary polygon mirrors, an interval between the image supporters is set equal to an integer multiple of a scanning pitch. The timing for starting writing the pixel images is adjusted at a unit of period necessary for one optical beam scanning. Accordingly, it is possible to prevent an image shift greater than one scanning pitch in the sub scanning direction over the entire image.

As for a technology disclosed in Japanese Laid-Open Patent Application Publication No. S64-73369, a PLL (Phase Locked Loop) control unit starts controlling rotational speed of a rotary polyhedron (rotary polygon mirror) in accordance with a reference frequency signal generated by the reference frequency signal generation unit. Further, synchronizing sensors generate horizontal synchronizing signals by receiving a laser beam deflected by the rotary polyhedron rotating at constant speed. Then, a timing measurement unit synchronizes the horizontal synchronizing signal output from one of the synchronizing sensors, and measures a timing difference of the horizontal synchronizing signals output from the other synchronizing sensors in accordance with the reference frequency signal. A phase control unit adjusts a phase of the reference frequency signal supplied to the PLL control unit in accordance with the measured timing difference of the output horizontal synchronizing signals.

With this structure, it is possible to adjust a phase shift minutely within a pixel distance, and a shift of the top scanning line of the laser beam on the photosensitive drums (image supporters) may be set minimum.

In the case where both sides (the first surface (a surface) and the second surface (the other surface)) of the object to be printed are printed by utilizing the above described conventional image forming device, the pixel images (toner) transferred onto the object to be printed are heated and fused, and thus moisture in the sheet is evaporated so that the object size is reduced. In this case, for example, when the object having two surfaces such as a sheet is printed, i.e., both a printing region on the first surface and a printing region on the second surface of the object are printed, the size of the object to be printed is reduced upon heating and fusing the image transferred onto the first surface to be printed. Accordingly, the rotational speed of the rotary polygon mirror should be switched twice, i.e., after completing drawing (printing) the first surface until starting drawing (printing) the second surface, and after drawing the second surface until starting drawing a first surface of another sheet.

However, even if the rotational speed of the rotary polygon mirror is switched according to the rotation reference signal, the inertia (inertial energy) of the polygon motor is still high. It is difficult to immediately change the rotational speed in accordance with the rotation reference signal. Further, a period necessary to repeat acceleration and deceleration until the rotation is stabilized depends on the respective polygon motors.

Moreover, the rotational speed of the rotary polygon mirror is switched in accordance with an order of printing. Hence, there is a period when the rotational speed of the rotary polygon mirror to be a reference is different from the rotational speed of the other rotary polygon mirrors. Accordingly, there is a problem in that a position to print in the sub scanning direction of the other rotary polygon mirrors cannot be obtained in accordance with the horizontal synchronizing signal corresponding to the reference rotary polygon mirror.

SUMMARY OF THE INVENTION

It is a general object of the present invention to provide an optical beam scanner that substantially obviates one or more problems caused by the limitations and disadvantages of the related art.

It is another and more specific object of the present invention to provide an optical beam scanner, an image forming device, and an optical beam scanning method to realize forming a high quality image by utilizing optical beam scanning according to a rotary polygon mirror.

To achieve these and other advantages in accordance with the purpose of the invention, an embodiment of the invention provides an optical beam scanner that includes a driving unit rotating a rotary polygon mirror that deflects and scans an optical beam onto an image supporter; a rotation position detection unit detecting a rotation position of the rotary polygon mirror; a rotation control unit controlling the driving unit in accordance with a rotation reference signal of the rotary polygon mirror and an output signal of the rotation position detection unit; an optical beam detection unit detecting the optical beam deflected and scanned by the rotary polygon mirror at a predetermined position on a scanning path so as to generate a horizontal synchronizing signal; a rotation reference signal generator generating a rotation reference signal of the rotary polygon mirror; a first timing generation unit generating a first reference timing so that the rotation reference signal generator generates the rotation reference signal to print a first surface of an object to be printed which object includes the first surface and a second surface; a second timing generation unit generating a second reference timing so that the rotation reference signal generator generates the rotation reference signal to print the second surface of the object; a timing measurement unit measuring a counter value generated by the first timing generation unit according to the horizontal synchronizing signal generated by the optical beam detection unit; and a phase control unit controlling a phase of the rotation reference signal to be supplied to the driving unit in accordance with the counter value obtained by the timing measurement unit.

According to at least an embodiment of the present invention, an image forming device includes at least the above described optical beam scanner.

According to at least an embodiment of the present invention, an optical beam scanning method is provided that includes the steps of rotating a rotary polygon mirror that deflects and scans an optical beam onto an image supporter; detecting the optical beam deflected and scanned by the rotary polygon mirror at a predetermined position on a scanning path so as to generate a horizontal synchronizing signal; generating a rotation reference signal of the rotary polygon mirror; controlling the rotating according to the horizontal synchronizing signal that is generated in the optical beam detecting step and the rotation reference signal of the rotary polygon mirror; generating a first reference timing to generate the rotation reference signal to print a first surface of an object to be printed having two surfaces; generating a second reference timing to generate the rotation reference signal to print the second surface of the object to be printed; measuring a counter value to generate the first reference timing obtained in the first reference timing generating step in accordance with the horizontal synchronizing signal obtained in the optical beam detecting step; and controlling a phase of the rotation reference signal to rotate the rotary polygon mirror in accordance with the counter value obtained in the counter value measuring step.

According to an aspect of the present invention, it is possible to realize forming a high quality image by using optical beam scanning according to a rotary polygon mirror.

BRIEF DESCRIPTION OF THE DRAWINGS

Other objects and further features of the present invention will become apparent from the following detailed description when read in conjunction with the accompanying drawings, in which:

FIG. 5A is a timing chart illustrating operations when printing on the first surface is switched to printing on the second surface;

FIG. 5B is a timing chart illustrating operations when printing on the second surface is switched to printing on the first surface of the next sheet;

FIG. 8 is a table showing an example of a calculation result of the pulse values for the counter values;

FIG. 10 is a timing chart of the rotation reference signal when the phase control is completed before and after the rotational speed of the rotary polygon mirror is changed.

DESCRIPTION OF THE PREFERRED EMBODIMENTS

In the following, embodiments of the present invention in which an optical beam scanner, an image forming device, and an optical beam scanning method are preferably worked are described with reference to the accompanying drawings. It should be noted that in the embodiment below, a description is given of an example in which a color laser beam printer (hereinafter, referred to as a color printer) which comprises four image forming units is used. However, the present invention is not limited to a color printer comprising four image forming units. The color printer may comprise at least one image forming unit.

<Image Forming Device (Color Printer)>

Figure 1:
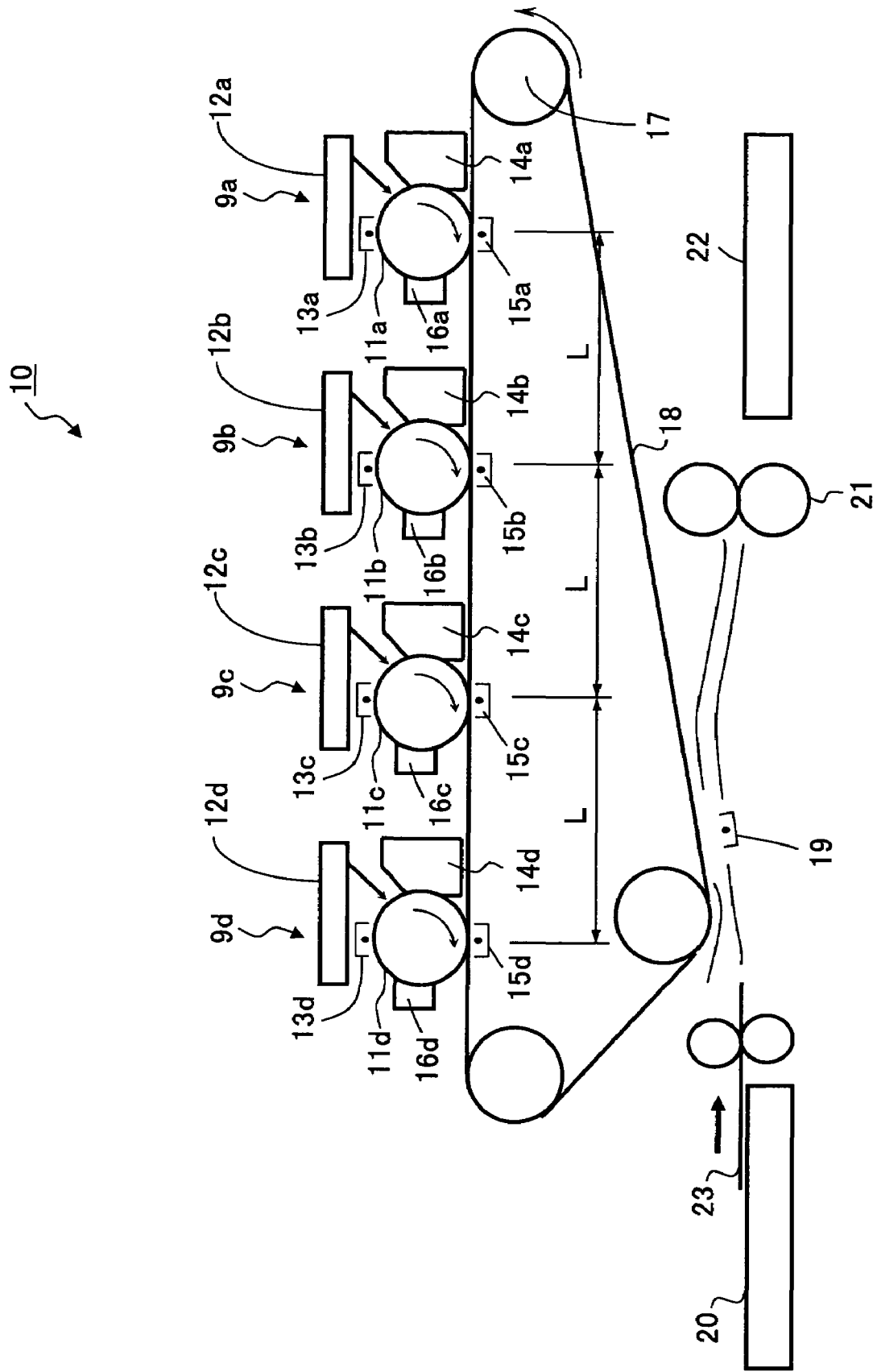
FIG. 1 is a schematic diagram of an image forming device according to an embodiment.

FIG. 1 is a view illustrating an example of a schematic configuration of an image forming device according to an embodiment. A color printer 10 shown in FIG. 1 as an image forming device comprises four image forming units 9a through 9d of respective colors, i.e., yellow (Y), magenta (M), cyan (C), and black (K) to form a color image by superposing monocolor images thereof.

In FIG. 1, the color printer 10 comprises photosensitive drums (photosensitive members) 11a through 11d, optical beam scanners 12a through 12d to scan optical beams onto the photosensitive drums 11a through 11d, electrifiers 13a through 13d, developing units 14a through 14d, first transfer units 15a through 15d, cleaners 16a through 16d, a belt driving roller 17, an intermediate transfer belt 18, a second transfer unit 19, a paper feeder 20, a fuser 21, and a paper catch tray 22.

Further, the above described image forming unit 9a comprises the photosensitive drum 11a, the optical beam scanner 12a, the electrifier 13a, the developing unit 14a, the first transfer unit 15a, and the cleaner 16a. The other image forming units 9b through 9d comprise the corresponding parts as shown in FIG. 1. It should be noted that, as shown in FIG. 1, the image forming units 9a through 9d are arranged at constant intervals (L).

Here, as an example, a description is given of operations (charging, exposure and development) of printing black (K). First, the photosensitive drum 11a charged by the electrifier 13a is exposed to an optical beam from the optical beam scanner 12a so as to form an electrostatic latent image. The electrostatic latent image is inverted and developed by the developing unit 14a so as to form a toner image on the photosensitive drum 11a.

On the other hand, the intermediate transfer belt 18 is driven by the belt driving roller 17 shown in FIG. 1 from right to left through a position between the photosensitive drum 11*a* and the first transfer unit 15*a*. The toner image on the photosensitive drum 11*a* is transferred to the intermediate transfer belt 18 at the first transfer unit 15*a*. The toner which is not transferred at the first transfer unit 15*a* is removed by the cleaner 14*a* from the photosensitive drum 11*a*.

As for the other colors (yellow (Y), magenta (M), and cyan (C)), the above described operations (charging, exposure, and development) are performed in the same manner as black (K). The other color toner images are transferred onto the intermediate transfer belt 18 at the first transfer units 15*b*, 15*c* and 15*d*, respectively, so as to be superposed on the previously transferred toner image. Accordingly, a color image is obtained.

The color image formed by superposing the plural toners on the intermediate transfer belt 18 is, at the second transfer unit 19, transferred onto a sheet 23 as an object to be printed which is fed from the paper feeder 20, heated and pressured to be fused by the fuser 21 and delivered to the paper catch tray 22 so that a printed image is obtained.

It should be noted that in the case where both sides of the sheet 23 are printed by the color printer 10 shown in FIG. 1, after printing on the first surface of the sheet 23 is completed, the sheet 23 is reversed by a paper reversing unit (not shown). Then, the sheet 23 is delivered from the side of the paper feeder 20 again through a position between the intermediate transfer belt 18 and the second transfer unit 19 so as to perform printing on the second surface of the sheet 23.

<Optical Beam Scanner>

Figure 2:
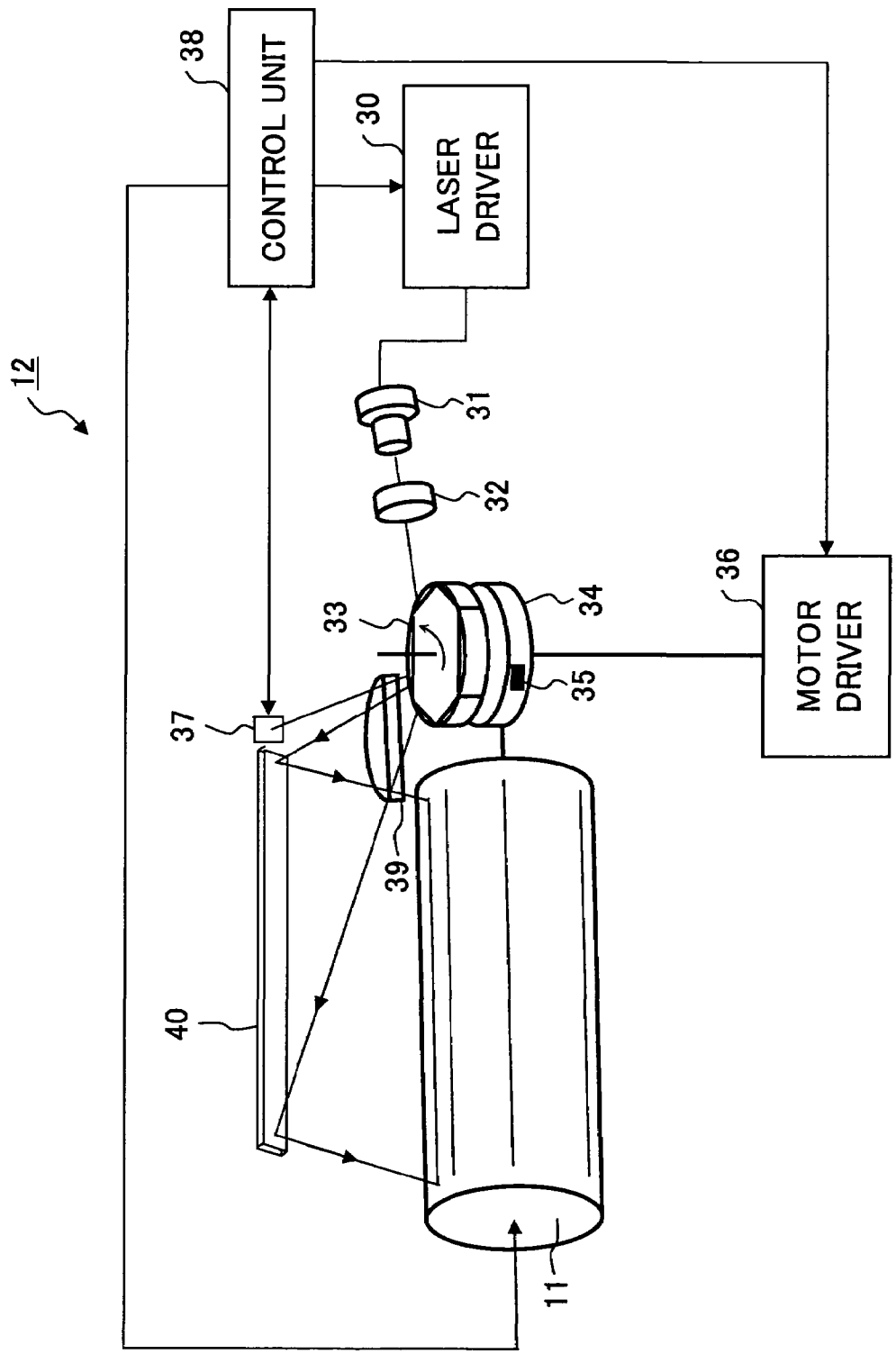
FIG. 2 is a view illustrating an example of a schematic configuration of an optical beam scanner.

Next, a configuration example of the above described optical beam scanner 12 is described with reference to FIG. 2. FIG. 2 is a view illustrating a schematic configuration example of the optical beam scanner 12. The optical beam scanner 12 in the color printer 10 comprises a laser driver 30, a semiconductor laser 31 as an optical beam generation unit, an optical lens 32, a rotary polygon mirror 33, a polygon motor 34 as a drive unit to rotate the rotary polygon mirror 33, a Hall device 35 as a rotating position detection unit, a motor driver 36 (PLL control circuit) as a rotation control unit to control the polygon motor 34, a laser beam detector 37 as an optical beam detection unit to detect an optical beam deflected and scanned by the rotary polygon mirror 33, a control unit 38 (controller) as an optical beam control unit to control the laser source in synchronization with an output signal of the laser beam detector 37, an fθ lens 39, and a reflection mirror 40.

Next, a description is given of operations of scanning an optical beam (laser beam) according to the configuration shown in FIG. 2. It is assumed that in FIG. 2, a rotation reference signal for one cycle is necessary to drive one surface scan of the rotary polygon mirror 33. That is, if the rotary polygon mirror 33 includes "M" surfaces, rotation reference signals for "M" cycles are needed for one revolution of the rotary polygon mirror 33. It is assumed that the Duty (time ratio expressed by H/L) of the rotation reference signal may be arbitrary.

First, the laser beam from each of the semiconductor lasers 31 is irradiated onto the optical lens 32 while it is switched ON and OFF by the laser driver 30 which operates in accordance with the image data on which color separation is performed based on the image signal to be formed. The laser beam irradiated by the optical lens 32 is changed to be a parallel beam by a collimating lens, a cylindrical lens, and the like, and then led onto the rotary polygon mirror 33 rotated by the polygon motor 34.

It should be noted that the motor driver 36 is a rotation control unit driving the rotary polygon mirror 33 to rotate at constant speed in accordance with the rotation reference signal obtained from the control unit 38 and an output signal from the Hall device 35. The laser beam incident on the rotary polygon mirror 33 which is rotated at constant speed by the motor driver 36 is deflected and scanned, and then led through the fθ lens 39, so that its deflection at constant angular velocity is changed to a deflection at constant linear speed. Thus, the laser beam is reflected onto the surface of the photosensitive drum 11 by the reflection mirror 40.

Further, the laser beam detector 37 is provided where scanning of the laser beam from the semiconductor laser 31 is started. As the laser beam is detected by the laser beam detector 37, the laser beam output signal is supplied to the control unit 38 as a horizontal synchronizing signal BD.

Upon forming a color image by the color printer 10 comprising the optical beam scanner 12 as shown by the above described schematic configuration, it is necessary to superpose images which are independently formed by the respective colors, i.e., yellow (Y), magenta (M), cyan (C) and black (K) at a precise position on the intermediate transfer belt 18. In order to superpose the images of the respective colors at the precise position on the intermediate transfer belt 18, the position where printing is started must be adjusted precisely in a main scanning direction and in a sub scanning direction by the laser beam corresponding to each of the photosensitive drums 11.

As for adjusting the position in the main scanning direction, where the scanning of the laser beam is started is always detected by the laser beam detector 37, and thereby where the image data are printed is adjusted for each of the colors. Accordingly, in the case where the images of the respective colors are superposed, color drift is limited to the minimum, even if relative locations between the optical beam scanner 12 and the photosensitive drum 11 in the color printer 10 for the respective colors do not completely correspond with each other.

On the other hand, as for adjusting the position in the sub scanning direction, the surface phase of the rotary polygon mirror 33 is controlled so as to adjust the exposure timing of the other color to the exposure timing of the reference color. Accordingly, when the images of the respective monocolors are superposed, color drift is limited to be minimum.

As described above, however, the sheet 23 shrinks since moisture in the sheet 23 is evaporated by being heated and fused by the fuser 21 shown in FIG. 1. In order to adjust the printing area on the second surface of the sheet 23 for the shrunken first surface, it is necessary to perform reduced printing on the second surface.

Accordingly, as for the sub scanning direction of the image forming device, it is necessary to switch the rotational speed of the rotary polygon mirror 33 twice, i.e., when imaging on the first surface is completed until imaging on the second surface is started, and when imaging on the second surface is completed until imaging on a first surface of another sheet is started. Further, since the rotational speed of the rotary polygon mirror 33 is switched in accordance with the order of imaging, there is a period in which the reference rotational speed of the rotary polygon mirror 33 may be different from the rotational speed of the other rotary polygon mirror 33.

Figure 3:
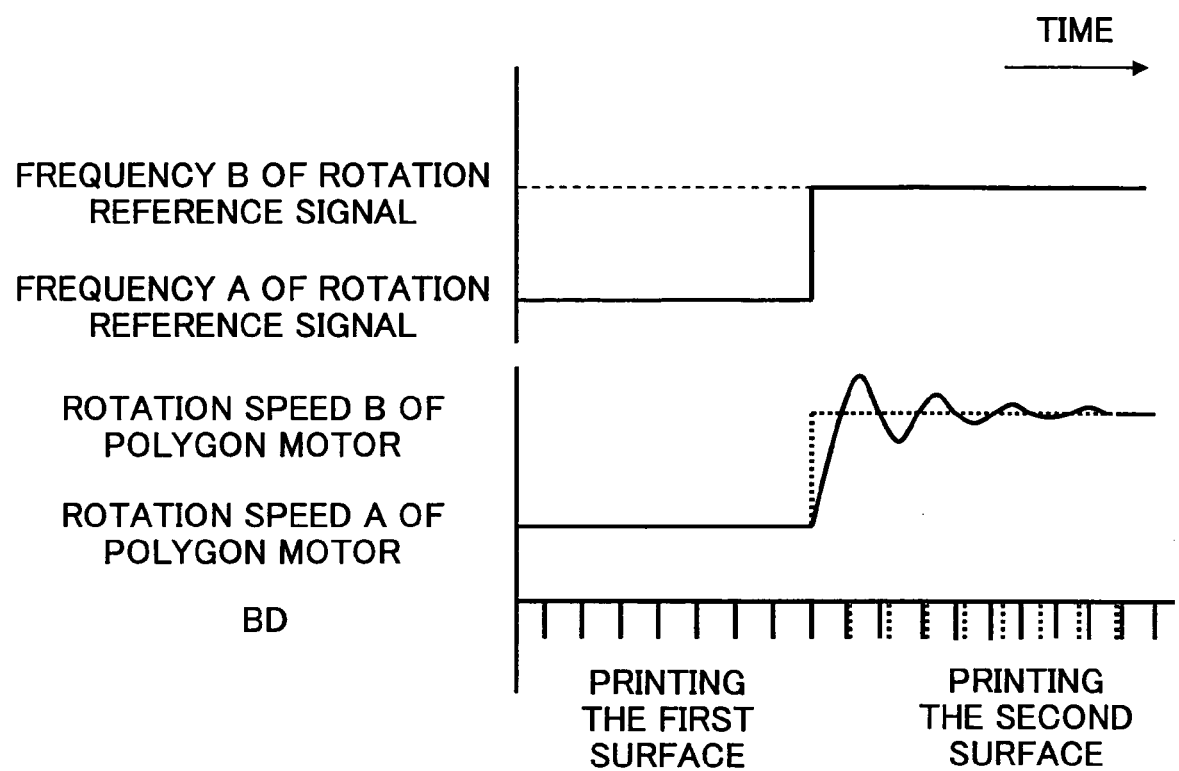
FIG. 3 is a graph illustrating an example of a relationship between the rotational speed of a polygon motor and a horizontal synchronizing signal BD.

FIG. 3 is a timing chart showing an example of a relationship between the rotational speed of the polygon motor and the horizontal synchronizing signal BD. It should be noted that the relationship in FIG. 3 is shown when the frequency of the rotation reference signal is switched.

As shown in FIG. 3, when a frequency "A" of the rotation reference signal supplied to the motor driver 36 of the polygon motor 34 is switched to a frequency "B" which is higher than the frequency "A", the motor driver 36 accelerates the polygon motor 34 so as to adjust a phase between the rotation reference signal and a signal from the Hall device 35.

However, even if the rotational speed of the rotary polygon mirror 33 is switched according to the rotation reference signal, the rotational speed does not immediately change due to the high inertia of the polygon motor 34. Accordingly, the rotational speed is gradually stabilized as shown in FIG. 3. Further, the period until the rotational speed is stabilized depends on the respective polygon motors 34.

Moreover, the horizontal synchronizing signal BD maintains its stabilized cycle until the frequency of the rotation reference signal is switched. However, when the frequency of the rotation reference signal is switched, the cycle is accelerated and decelerated over and over again by being affected by the accelerating and decelerating of the polygon motor 34, and then the horizontal synchronizing signal BD is gradually stabilized at a cycle a little earlier than the cycle before the rotation reference signal is switched.

Accordingly, as for a conventional image forming device, a position of starting printing in the sub scanning direction in the other rotary polygon mirror 33 in accordance with the horizontal synchronizing signal BD corresponding to the reference rotary polygon mirror 33 cannot be obtained immediately after the rotational speed is switched. Further, having to obtain the position of starting printing in the sub scanning direction for the other rotary polygon mirror 33 in accordance with the horizontal synchronizing signal corresponding to the reference rotary polygon mirror 33 after the rotation is stabilized reduces printing throughput.

The optical beam scanner 12 according to an embodiment of the present invention controls the rotation phase of the polygon motor 34 driving the corresponding rotary polygon mirror 33 so as to correct the surface phase of the corresponding rotary polygon mirror 33 only when the rotary polygon mirror 33 rotates at a speed used upon printing the first surface of the sheet 23. Hence, the position deviation is reduced.

Further, according to the embodiment of the present invention, when the rotary polygon mirrors 33 are rotated at a speed used upon printing the second surface, the rotation phase of the polygon motor 34 rotating the corresponding rotary polygon mirror 33 is not controlled, but the rotational speed of the polygon motor 34 rotating the rotary polygon mirror 33 is switched while the surface phase of the rotary polygon mirror 33 is maintained.

Figure 4:
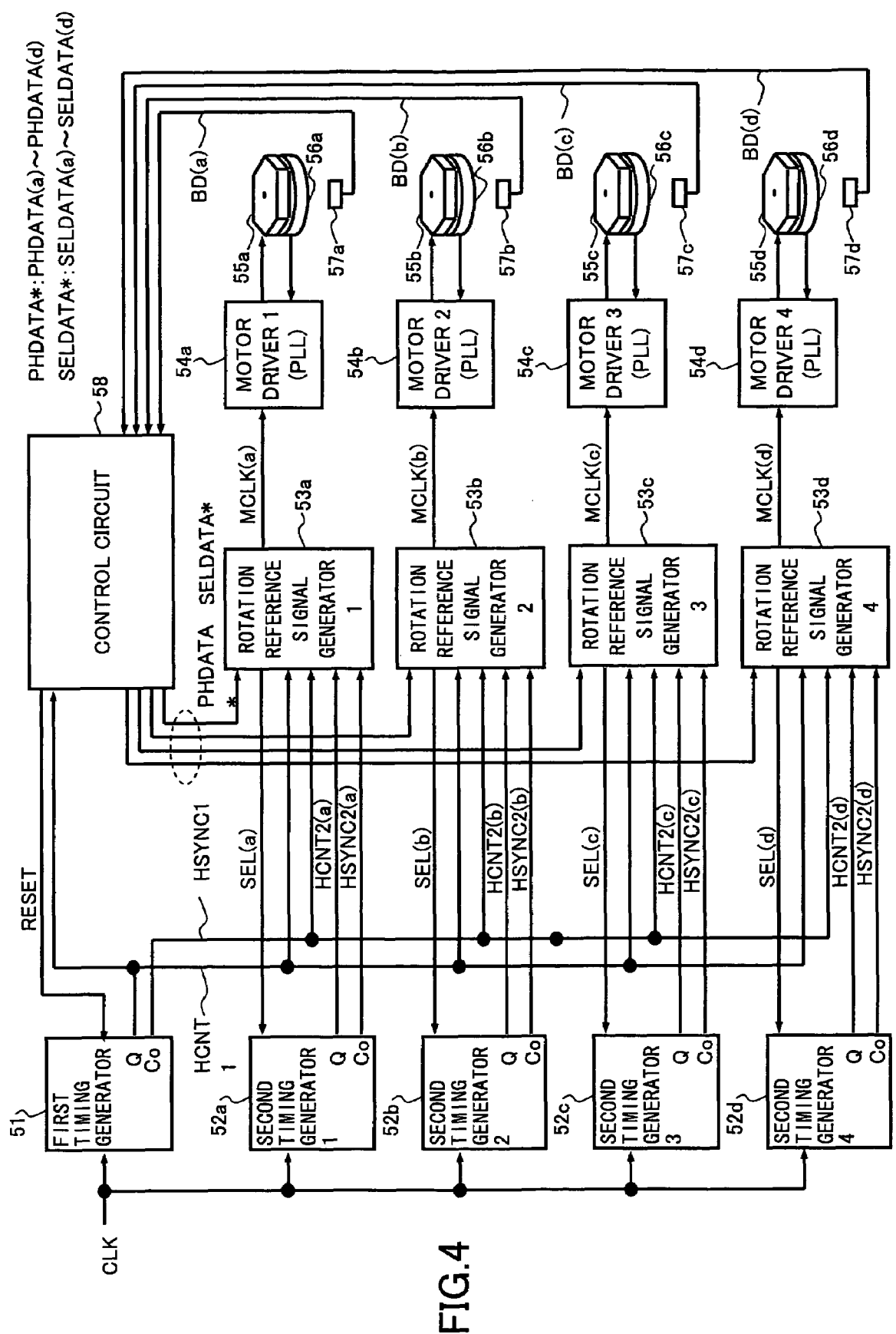
FIG. 4 is a block diagram illustrating a configuration example of an optical beam scanning control unit.

FIG. 4 is a block diagram illustrating a configuration example of an optical beam scanning control unit comprising four sets of the optical beam scanner 12 as described above. The scanning control unit shown in FIG. 4 comprises a first timing generator 51, second timing generators 52a through 52d, rotation reference signal generators 53a through 53d, motor drivers (PLL control units) 54a through 54d, rotary polygon mirrors 55a through 55d, polygon motors 56a through 56d, laser beam detection units 57a through 57d, and a control unit 58.

FIG. 5A is a timing chart illustrating operations when printing the first surface is switched to printing the second surface. FIG. 5B is a timing chart illustrating operations when printing the second surface is switched to printing a first surface of the next sheet.

The first timing generator 51 used upon printing the first surface generates a reference timing to generate the rotation reference signal determining the rotational speed and the rotation phase of the respective rotary polygon mirrors 55a through 55d. Further, the first timing generator 51 comprises a counter counting an input clock CLK. As shown in FIGS. 5A and 5B, the counter repeatedly counts a counter value HCNT1 assuming that a value $N_{H1}$ from 0 to $N_{H1}-1$ is a first predetermined cycle. Moreover, the counter defines a clock at the counter value $N_{H1}-1$ as a final clock of the first predetermined cycle and outputs the counter value HSYNC1 as a pulse signal of one clock. The counter value HCNT1 from 0 through $N_{H1}-1$ is supplied to the rotation reference signal generators 53a through 53d respectively corresponding to the rotary polygon mirrors 55a through 55d so as to be a reference timing to generate a rotation reference signal used for printing the first surface of a sheet.

The second timing generators 52a through 52d generate reference timings to generate rotation reference signals determining the rotational speeds and the rotation phases of the respective rotary polygon mirrors 55a through 55d upon printing the second surface of the sheet. The second timing generators 52a through 52d respectively comprise counters which count input clocks CLK. The respective counters repeatedly count corresponding counter values HCNT2 (a) through HCNT2 (d) (hereinafter, referred to as HCNT2*) assuming that a value $N_{H2}$ from 0 through $N_{H2}-1$ is a second predetermined cycle. Moreover, the counter defines a clock at the counter value $N_{H2}-1$ as a final clock of the second predetermined cycle and outputs the counter values HSYNC2 (a) through HSYNC2 (d) (hereinafter, referred to as HSYNC2*) as a pulse signal of one clock. The counter values HCNT2* from 0 through $N_{H2}-1$ are supplied to the rotation reference signal generators 53a through 53d respectively corresponding to the rotary polygon mirrors 55a through 55d so that the counter values HCNT2* become reference timings to generate rotation reference signals used for printing the second surface of the sheet.

When printing the first surface of the sheet, the rotation reference signal generators 53a through 53d generate rotation reference signals MCLK* determining the rotational speeds and the rotation phases of the respective rotary polygon mirrors 55a through 55d in accordance with the counter value HCNT1 generated by the first timing generator 51 so as to supply the rotation reference signals MCLK* to the motor drivers 54a through 54d as rotation control units controlling the polygon motors 56a through 56d respectively corresponding to the rotary polygon mirrors 55a through 55d. Moreover, when printing the second surface of the sheet, the rotation reference signal generators 53a through 53d generate rotation reference signals MCLK* determining the rotational speeds and the rotation phases of the respective rotary polygon mirrors 55a through 55d in accordance with the counter values HCNT2* respectively generated by the second timing generators 52a through 52d so as to supply the rotation reference signals MCLK* to the motor drivers 54a through 54d as rotation control units controlling the polygon motors 56a through 56d respectively corresponding to the rotary polygon mirrors 55a through 55d.

In accordance with the rotation reference signals MCLK* supplied from the rotation reference signal generators 53a through 53d and the output signals from the above described Hall devices 35 detecting the positions where the polygon motors 56a through 56d rotate, the motor drivers 54a through 54d control the polygon motors 56a through 56d so that the polygon motors 56a through 56d rotate at constant speed. Moreover, from the Hall devices 35, pulse signals having a frequency repeatedly switched ON and OFF corresponding to the rotation of the polygon motors 56a through 56d are supplied to the motor drivers 54a through 54d, respectively.

Since the rotary polygon mirrors 55a through 55d are respectively formed on the axes of the polygon motors 56a through 56d, the rotary polygon mirrors 55a through 55d rotate together with the corresponding polygon motors 56a through 56d. When the polygon motors 56a through 56d respectively rotate at constant speed, the above described semiconductor lasers light up so that the laser beams pass through sensor portions of the laser beam detection units 57a through 57d. According to the lighting of the semiconductor lasers, horizontal synchronizing signals BD (a) through BD (d) (hereinafter, referred to as BD*) are supplied from the laser beam detection units 57a through 57d to the control circuit 58.

<Configuration of the Control Circuit 58>

Figure 6:
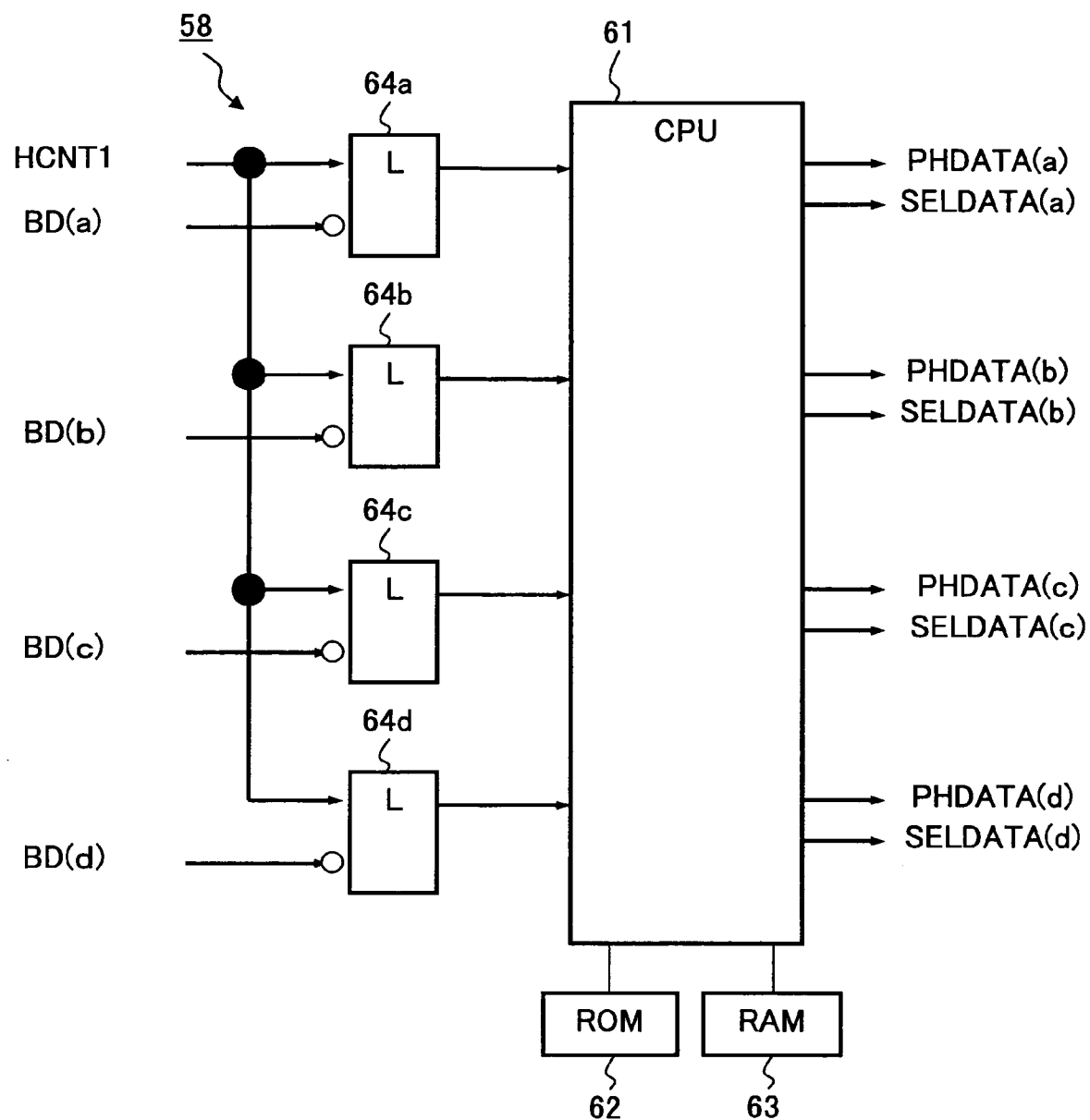
FIG. 6 is a configuration example of a control circuit.

A description is given of a configuration of the control circuit 58 with reference to FIG. 6. FIG. 6 is a configuration example of the control circuit 58. The control circuit 58 comprises a CPU (Central Processing Unit) 61, a ROM (Read Only Memory) 62, a RAM (Random Access Memory) 63, and latch circuits 64a through 64d. The latch circuits 64a through 64d are plural measuring units measuring the counter value HCNT1 generated by the first timing generator 51 by the horizontal synchronizing signals BD* supplied from the respective laser beam detection units 57a through 57d.

The CPU 61 executes a micro program stored in the ROM 62 loaded in the RAM 63, and thereby controls respective signals. The control circuit 58 measures the counter value HCNT1 from 0 to $N_{H1}-1$ generated by the first timing generator 51 according to the respective horizontal synchronizing signals BD. Then, the control circuit 58 obtains phase differences among the respective horizontal synchronizing signals in accordance with the measured values, converts the phase differences to the phase data for correction, and supplies the phase data to the rotation reference signal generators 53a through 53d.

<Rotation Reference Signal Generator 53>

Figure 7:
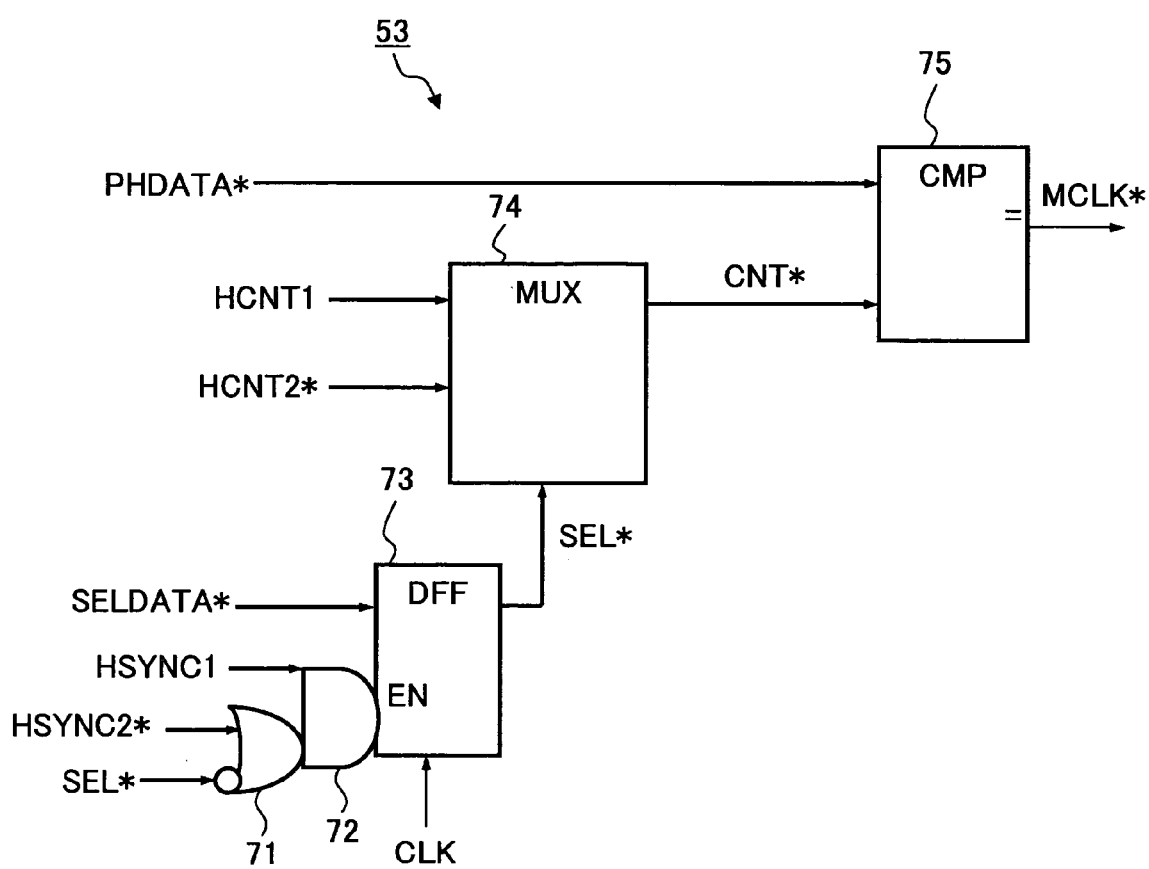
FIG. 7 is a block diagram illustrating an example of a rotation reference signal generator.

Next, a description is given of the rotation reference signal generators 53a through 53d with reference to FIG. 7. FIG. 7 is a block diagram illustrating an example of the rotation reference signal generator 53. The rotation reference signal generator 53 shown in FIG. 7 comprises an OR gate 71, an AND gate 72, a D flip-flop 73, a selector 74, and a comparator 75.

The D flip-flop 73 inputs corresponding one of printing surface selecting signals SELDATA(a) through SELDATA (d) (hereinafter, referred to as SELDATA*) supplied from the control circuit 58, which signal switches the rotational speed of the rotary polygon mirror 55 in accordance with the case of printing the first surface of the sheet and the case of printing the second surface of the sheet. Further, the D flip-flop 73 is provided with an enable terminal. In the case where the pulse signal HSYNC1 from the first timing generator 51 is input to the enable terminal together with one of the pulse signals HSYNC2* from the second timing generators 52a through 52d, or in the case where the pulse signal HSYNC1 from the first timing generator 51 is supplied to the enable terminal at a time when an output signal SEL* of the D flip-flop 73 is "L", the status of the printing surface selecting signal SELDATA* which is supplied from the control circuit 58 to the input terminal D at a rise time of the clock CLK is reflected at the output terminal as the output signal SEL*. It should be noted that the status of the input terminal D is not reflected at the output terminal unless the above described conditions are satisfied.

The counter value HCNT1 generated by the first timing generator 51 and the counter value HCNT2* generated by the corresponding one of the second timing generators 52a through 52d are supplied to the selector 74. Further, the selector 74 selects data of the input terminal to be output in accordance with the output signal SEL* of the D flip-flop 73. When the selecting signal SEL* is "L", the selector 74 outputs the timing signal HCNT1 from the first timing generator 51 as a signal CNT*. On the other hand, when the selecting signal SEL* is "H", the selector 74 outputs the timing signal HCNT2* from the second timing generator 52 as the signal CNT*.

The comparator 75 compares corresponding one of phase data signals PHDATA (a) through PHDATA (d) (hereinafter, referred to as PHDATA*) controlling the rotation phase of the rotary polygon mirror 55, which phase data signal is supplied from the control circuit 58 with the timing signal CNT* output from the selector 74. In the case where the two signals coincide with each other, the comparator 75 outputs a signal MCLK as a pulse signal. The timing generated by the first timing generator 51 must be smoothly switched to the timing generated by the second timing generator 52 so as to avoid a shift of the surface phase of the rotary polygon mirror 55 in the case where the rotational speed of the rotary polygon mirror 55 is switched.

On the contrary, when the rotational speed of the rotary polygon mirror 55 is returned to its original speed, the timing generated by the second timing generator 52 shown in FIG. 4 must be smoothly switched to the timing generated by the first timing generator 51.

To realize the above described operations, the final clock of the first predetermined cycle of the timing generated by the first timing generator 51 is switched to the first clock of the second predetermined cycle of the timing generated by the second timing generator 52. Thus, a phase shift of the rotation reference signal is prevented. Further, in the same manner, the final clock of the second predetermined cycle of the timing generated by the second timing generator 52 is switched to the first clock of the first predetermined cycle of the timing generated by the first timing generator 51, and thus a phase shift of the rotation reference signal is prevented. The timing is the same as the timing when the pulse signal HSYNC1 output at the final clock of the first predetermined cycle generated by the first timing generator 51 is output together with the pulse signal HSYNC2* output at the final clock of the second predetermined cycle generated by the second timing generator 52.

Here, a description is given of operations of switching one printing surface to the other printing surface with reference to FIGS. 5A and 5B as described above. First, as shown in FIG. 5A, in the case where the printing on the first surface is switched to the printing on the second surface, when a reset signal RESET from the control circuit 58 is disabled, the counter of the first timing generator 51 repeatedly counts the counter value HCNT1 by $N_{H1}$ values from 0 to $N_{H1}-1$ as described above. Further, the counter of the first timing generator 51 outputs a pulse signal HSYNC1 of one clock as a carry output when the counter value is $N_{H1}-1$.

In the case where the pulse signal HSYNC1 from the first timing generator 51 is input at a time when the signals SEL (a) through SEL (d) (hereinafter, referred to as SEL*) are "L", at a rise time of the clock, the printing surface selecting signal SELDATA* is reflected in the signal SEL* so that the signal SEL* is switched to "H". Moreover, the status of the signal of the input terminal D is reflected at the output terminal as the output signal SEL*.

In the second timing generator 52, when the signal SEL* of the rotation reference signal generators 53a through 53d is "H", the counter repeatedly counts the counter value HCNT2 by $N_{H2}$ values from 0 to $N_{H2}-1$ as described above. Further, the counter of the second timing generator 52 outputs a pulse signal HSYNC2* of one clock as a carry output when the counter value is $N_{H2}-1$.

Returning to FIG. 7, the selector 74 of the rotation reference signal generator 53 supplies a signal CNT* equaling the timing signal HCNT1 from the first timing generator 51 to the comparator 75 when the signal SEL* is "L". On the other hand, when the signal SEL* is switched to "H", the selector 74 supplies the signal CNT* equaling the timing signal HSYNC2* from the second timing generator 52 to the comparator 75. The comparator 75 compares the phase data signal PHDATA* with the signal CNT* so as to generate the signal MCLK*.

According to the signal SEL*, the final clock of a first predetermined cycle of the timing generated by the first timing generator 51 is smoothly switched to the first clock of a second predetermined cycle of the timing generated by the second timing generator 52. Hence, a phase shift of the rotation reference signal is prevented.

On the other hand, as shown in FIG. 5B, in the case where the printing on the second surface is switched to the printing on the first surface of the next object (sheet) to be printed, when the signal SEL* is "H", and when the pulse signal HSYNC1 from the first timing generator 51 is input together with the pulse signal HSYNC2 from the second timing generator 52, at a rise time of the clock, the printing surface selecting signal SELDATA* causes the signal SEL* to be switched to "L".

The selector 74 of the rotation reference signal generator 53 supplies the signal CNT* equaling the timing signal HCNT2 from the second timing generator 52 to the comparator 75 when the signal SEL* is "H". On the contrary, when the signal SEL* is switched to "L", the selector 74 supplies the signal CNT* equaling the timing signal HCNT1 from the first timing generator 51 to the comparator 75. The comparator 75 compares the phase data PHDATA* with the signal CNT* so as to generate the signal MCLK*.

When the signal SEL* of the rotation reference signal generators 53a through 53d is "L", the counter of the second timing generator 52 stops counting and clears the counter value HCNT2 to zero. As described above, according to the signal SEL*, the final clock of the second predetermined cycle of the timing generated by the second timing generator 52 is smoothly switched to the first clock of the first predetermined cycle of the timing generated by the first timing generator 51. Hence, a phase shift of the rotation reference signal is prevented.

It should be noted that the reduction ratio X of printing the second surface to printing the first surface of the sheet is expressed by:

$$X = \frac{N_{H2}}{N_{H1}}$$

in which $N_{H1}$ is a counter value of the first predetermined cycle of the timing generated by the first timing generator 51, and $N_{H2}$ is a counter value of the second predetermined cycle of the timing generated by the second timing generator 52.

Next, based on the reduction ratio X of printing the second surface to printing the first surface of the sheet, it is determined how many times the difference between printing the first surface and the reduction ratio X of printing the second surface is contained in printing the first surface. This expresses a pulse value P2 of the pulse signal HSYNC2 output in a printing surface switching cycle in the case where the pulse signal HSYNC1 output at a final clock of the first predetermined cycle generated by the first timing generator 51 is repeatedly output together with the pulse signal HSYNC2 output from the second timing generator 52. At this moment, P2 is expressed by an equation, i.e., P2=1/(1−X).

It should be noted that if the pulse value P2 is not an integer, a number of sheets are printed until the pulse signal HSYNC1 is output together with the pulse signal HSYNC2 again. Hence, it is impossible to print the first surface and the second surface alternately. Similarly, at a time when repeatedly and simultaneously outputting the pulse signal HSYNC1 which is output at a final clock of the first predetermined cycle generated by the first timing generator 51 and the pulse signal HSYNC2 which is output by the second timing generator 52, a pulse value P1 of the pulse signal HSYNC1 which is output in the printing surface switching cycle is obtained.

Here, a product of the counter value $N_{H1}$ of the first predetermined cycle of the timing generated by the first timing generator 51 and the pulse value P1 of the pulse signal HSYNC1 output in the printing surface switching cycle is equivalent to the product of the counter value $N_{H2}$ of the second predetermined cycle of the timing generated by the second timing generator 52 and the pulse value P2 of the pulse signal HSYNC2 output in the printing surface switching cycle. This is expressed by an equation:

$$P1 \times N_{H1} = P2 \times N_{H2}$$

The pulse value P1 of the pulse signal HSYNC1 is obtained from the above equation:

$$P1 = P2 \times \frac{N_{H2}}{N_{H1}} = \frac{1}{1-X} \times X = \frac{X}{1-X}$$

It should be noted that the pulse value P1 of the pulse signal HSYNC1 must be an integer in the same manner as the pulse value P2 of the pulse signal HSYNC2.

FIG. 8 is a table showing an example of a calculation result of the pulse values for the counter values. As an example, in FIG. 8, when the counter value $N_{H1}$ of the first predetermined cycle of the timing generated by the first timing generator 51 is equal to 4000, the counter value $N_{H2}$ of the second predetermined cycle of the timing generated by the second timing generator 52 is changed in the range between 3950 and 3999. Further, the reduction ratio X of the second surface is in the range between 0.9875 and 0.99975. Thus, the pulse value P1 of the pulse signal HSYNC1 output in the printing surface switching cycle and the pulse value P2 of the pulse signal HSYNC2 are calculated.

In the case where the pulse value P1 or P2 is an integer (for example, P1=79, P2=80, $N_{H1}$=4000, $N_{H2}$=3960, and the like), the product ($N_{H1} \times P1$) of the counter value $N_{H1}$ and the pulse value P1 or the product ($N_{H2} \times P2$) of the counter value $N_{H2}$ and the pulse value P2 is equal to a least common multiple of the counter values $N_{H1}$ and $N_{H2}$. At this time, as for an interval of simultaneous occurrence of the pulse signal HSYNC1 which is output at a final clock of the first predetermined cycle generated by the first timing generator 51 and the pulse signal HSYNC2* output by the second timing generator 52, even when the reduction ratio X is equal to 0.99975, the pulse value P1 of the pulse signal HSYNC1 output in the printing sheet switching cycle is equal to 3999.

On the contrary, in the case where the pulse value P1 or P2 is not an integer, the product of the counter value $N_{H1}$ and the pulse value P1 or the product of the counter value $N_{H2}$ and the pulse value P2 is neither an integer nor the least common multiple of the counter values $N_{H1}$ and $N_{H2}$.

Accordingly, as shown in FIG. 8, in the image forming device according to the present invention, in order to print the first surface and the second surface alternately, it is preferable that the reduction ratio X of printing the second surface to printing the first surface be set so that the value X/(1−X) or the value 1/(1−X) is an integer.

<Example of the Rotation Reference Signal Supplied from the Rotation Reference Signal Generator 53>

Figure 9:
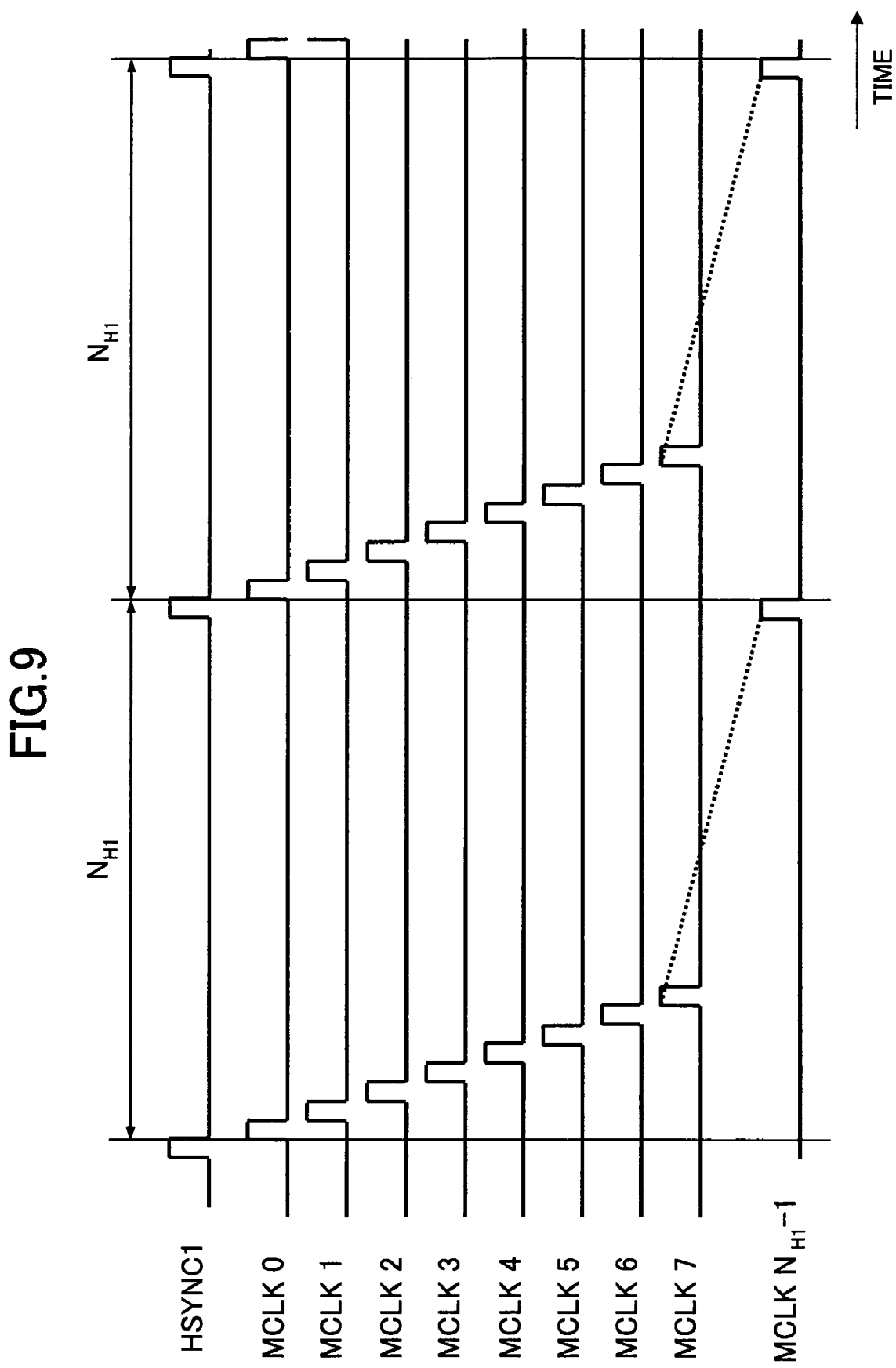
FIG. 9 is a timing chart illustrating an example of a rotation reference signal output from a rotation reference signal generator.

Next, a description is given of an example of the rotation reference signal output from the rotation reference signal generator 53 with reference to a timing chart. FIG. 9 is a timing chart illustrating an example of a rotation reference signal output from a rotation reference signal generator. In FIG. 9, numerals (0 through $N_{H1}-1$) subsequent to the letters "MCLK" show phase data from the control circuit 58.

For example, in the case where the phase data are "0", the rotation reference signal generator 53 outputs a rotation reference signal at a timing of MCLK0 shown in FIG. 9. Further, when the phase data are "1", the rotation reference signal generator 53 outputs a rotation reference signal at a timing of MCLK1 shown in FIG. 9. Moreover, when the phase data are "7", the rotation reference signal generator 53 outputs a rotation reference signal at a timing of MCLK7 shown in FIG. 9. As described above, the phase can be controlled at a unit of the input signal CLK.

In addition, FIG. 10 is a timing chart of the rotation reference signal when the phase control is completed before and after the rotation speed of the rotary polygon mirror is changed. As described above, according to an embodiment of the present invention, since the size of the sheet is reduced by being heated and fused after the first surface thereof is printed, a reduced printing is performed on the printing region on the second surface so as to adjust the printing region on the second surface to the printing region on the first surface. It should be noted that the reduction ratio X upon printing the second surface is at most 0.97=<X<1 since the size reduction of the first surface is caused by evaporation of the moisture in the sheet. Moreover, since the reduction ratio X is a value approximately equal to 1, even if the phase of the first surface of the rotary polygon mirror is set the same as the phase of the second surface, there is no influence on the position deviation.

Furthermore, in FIG. 10, the signal MCLK0 is a rotation reference signal before phase control is performed, while MCLKA is a rotation reference signal after the phase control is performed. It should be noted that even before and after the phase control is performed, the rotation phase on which the phase control is performed remains as "A". That is, the phase control of the rotary polygon mirror for correcting misplacement is performed only when printing the first surface. On the other hand, when performing a reduced printing on the second surface, the phase control is not performed but the phase control data used upon printing the first surface are used as is.

As described above, according to the embodiment of the present invention, it is possible to realize forming a high quality image according to an optical beam scanned by the rotary polygon mirror. More specifically, in order to adjust a printing region on the second surface to the first surface of the sheet which printing region is reduced in size according to heating and fusing, an optical beam scanner according to an embodiment of the present invention is applied to an image forming device in which the rotational speed of the rotary polygon mirror is switched so as to perform reduced printing on the second surface compared to the first surface. By doing so, position deviation can be reduced to minimum so as to obtain a high quality color image with less color deviation even if the total time necessary to stabilize the rotation after the rotational speed is switched depends on the respective polygon motors; alternatively, a rotary polygon mirror at a rotational speed for printing the first surface of the sheet and another rotary polygon mirror at a rotational speed for printing the second surface are simultaneously in one image forming device.

Further, the present invention is not limited to these embodiments, but variations and modifications may be made without departing from the scope of the present invention.

The present application is based on Japanese Priority Application No. 2005-244351 filed on Aug. 25, 2005, with the Japanese Patent Office, the entire contents of which are hereby incorporated by reference.

What is claimed is:

1. An optical beam scanner, comprising:
    a driving unit rotating a rotary polygon mirror that deflects and scans an optical beam onto an image supporter;
    a rotation position detection unit detecting a rotation position of the rotary polygon mirror;
    a rotation control unit controlling the driving unit in accordance with a rotation reference signal of the rotary polygon mirror and an output signal of the rotation position detection unit;
    an optical beam detection unit detecting the optical beam which is deflected and scanned by the rotary polygon mirror at a predetermined position on a scanning path so as to generate a horizontal synchronizing signal;
    a rotation reference signal generator generating a rotation reference signal of the rotary polygon mirror;
    a first timing generation unit generating a first reference timing so that the rotation reference signal generator generates the rotation reference signal to print a first surface of an object to be printed, said object including the first surface and a second surface;
    a second timing generation unit generating a second reference timing so that the rotation reference signal generator generates the rotation reference signal to print the second surface of the object;
    a timing measurement unit measuring a counter value generated by the first timing generation unit according to the horizontal synchronizing signal generated by the optical beam detection unit; and
    a phase control unit controlling a phase of the rotation reference signal to be supplied to the driving unit in accordance with the counter value obtained by the timing measurement unit.

2. The optical beam scanner as claimed in claim 1, wherein the phase control unit changes a rotational speed of the rotary polygon mirror in a case where a final clock of a first predetermined cycle of the first reference timing obtained from the first timing generation unit coincides with a final clock of a second predetermined cycle of the second reference timing obtained from the second timing generation unit.

3. The optical beam scanner as claimed in claim 1, wherein the phase control unit controls the phase of the rotation reference signal so that a value obtained from X/(1–X) or 1/(1–X) is an integer where a value X is a ratio of a reduced printing of the second surface to the first surface.

4. The optical beam scanner as claimed in claim 1, wherein the phase control unit controls the phase of the rotation reference signal of the rotary polygon mirror to correct misplacement only at a time of printing the first surface, and a result obtained from the phase control used to print the first surface is used as is to print the second surface.

5. An image forming device, comprising at least said optical beam scanner as claimed in claim 1.

6. The image forming device as claimed in claim 5, in a case where a plurality of colors are used to form an image, said image forming device further comprising plural of said optical beam scanners respectively corresponding to said plurality of colors.

7. An optical beam scanning method, comprising the steps of:
rotating a rotary polygon mirror that deflects and scans an optical beam onto an image supporter;
detecting the optical beam deflected and scanned by the rotary polygon mirror at a predetermined position on a scanning path so as to generate a horizontal synchronizing signal;
generating a rotation reference signal of the rotary polygon mirror;
controlling said rotating in accordance with the horizontal synchronizing signal that is generated in the optical beam detecting step and the rotation reference signal of the rotary polygon mirror;
generating a first reference timing to generate the rotation reference signal to print a first surface of an object to be printed having the first surface and a second surface;
generating a second reference timing to generate the rotation reference signal to print the second surface of the object to be printed;
measuring a counter value to generate the first reference timing obtained in said first reference timing generating step according to the horizontal synchronizing signal obtained in the optical beam detecting step; and
controlling a phase of the rotation reference signal to rotate the rotary polygon mirror in accordance with the counter value obtained in the counter value measuring step.

8. The optical beam scanning method as claimed in claim 7, wherein the phase controlling step further comprises a step of changing a rotational speed of the rotary polygon mirror in a case where a final clock of a first predetermined cycle of the first reference timing obtained in the first timing generating step coincides with a final clock of a second predetermined cycle of the second reference timing obtained in the second timing generating step.

9. The optical beam scanning method as claimed in claim 7, wherein the phase controlling step further comprises a step of controlling the phase of the rotation reference signal so that a value obtained from X/(1–X) or 1/(1–X) is an integer where a value X is a ratio of a reduced printing of the second surface to the first surface.

10. The optical beam scanning method as claimed in claim 7, wherein the phase controlling step further comprises the steps of:
controlling a phase of the rotation reference signal of the rotary polygon mirror to correct misplacement only at a time of printing the first surface; and
performing a phase control on the rotation reference signal of the rotary polygon mirror at a time of printing the second surface by using a result obtained in the phase controlling step as is, said phase controlling step being performed to correct misplacement only at the time of printing the first surface.

* * * * *